US011880557B2

(12) United States Patent
Tilikin et al.

(10) Patent No.: US 11,880,557 B2
(45) Date of Patent: Jan. 23, 2024

(54) DISTRIBUTED EDITING AND VERSIONING FOR GRAPHICAL SERVICE MAPS OF A MANAGED NETWORK

(71) Applicant: ServiceNow, Inc., Santa Clara, CA (US)

(72) Inventors: Alexei Tilikin, Petah (IL); Tal Epshtein, Hod Hasharon (IL); Netta Hasdai, Tel Aviv (IL)

(73) Assignee: ServiceNow, Inc., Santa Clara, CA (US)

( * ) Notice: Subject to any disclaimer, the term of this patent is extended or adjusted under 35 U.S.C. 154(b) by 289 days.

(21) Appl. No.: 15/882,711

(22) Filed: Jan. 29, 2018

(65) Prior Publication Data
US 2019/0235742 A1   Aug. 1, 2019

(51) Int. Cl.
| | |
|---|---|
| *G06F 3/04847* | (2022.01) |
| *H04L 41/22* | (2022.01) |
| *G06T 11/60* | (2006.01) |
| *G06F 3/0482* | (2013.01) |
| *H04L 41/0853* | (2022.01) |
| *H04L 43/0817* | (2022.01) |
| *G06T 11/20* | (2006.01) |

(52) U.S. Cl.
CPC ........ *G06F 3/04847* (2013.01); *G06F 3/0482* (2013.01); *G06T 11/60* (2013.01); *H04L 41/0853* (2013.01); *H04L 41/22* (2013.01); *H04L 43/0817* (2013.01); *G06T 11/206* (2013.01); *G06T 2200/24* (2013.01)

(58) Field of Classification Search
CPC .. G06F 3/04847; G06F 3/0482; G06F 40/197; G06T 11/60
See application file for complete search history.

(56) References Cited

U.S. PATENT DOCUMENTS

| | | |
|---|---|---|
| 5,978,594 A | 11/1999 | Bonnell |
| 6,321,229 B1 | 11/2001 | Goldman |
| 6,609,122 B1 | 8/2003 | Ensor |

(Continued)

OTHER PUBLICATIONS

ServiceNow Documentation, Service Mapping, Nov. 9, 2017 (downloaded from public web site https://docs.servicenow.com).

(Continued)

*Primary Examiner* — Daniel Samwel
*Assistant Examiner* — David Tan
(74) *Attorney, Agent, or Firm* — Fletcher Yoder, PC

(57) ABSTRACT

A remote network management platform manages a managed network. The managed network may contain computing devices for executing applications. The remote network management platform may also include a database storing a graph that represents the computing devices, the applications, and relationships therebetween. A computing device may be configured to generate and provide a graphical user interface that includes: (i) a panel containing an active copy of the graph read from the database, (ii) a first selectable control that creates an editable, private copy of the graph and replaces the active copy of the graph in the panel with the editable, private copy of the graph, and (iii) a second selectable control that updates the active copy of the graph with the editable, private copy of the graph, saves the active copy of the graph as updated to the database, and displays the active copy of the graph as updated.

20 Claims, 13 Drawing Sheets

(56) References Cited

U.S. PATENT DOCUMENTS

| | | |
|---|---|---|
| 6,799,189 B2 | 9/2004 | Huxoll |
| 6,816,898 B1 | 11/2004 | Scarpelli |
| 6,895,586 B1 | 5/2005 | Pulsipher |
| 6,968,535 B2 | 11/2005 | Stelting et al. |
| 6,970,919 B1* | 11/2005 | Doi .................... H04L 41/0631 |
| | | 345/440 |
| 7,027,411 B1 | 4/2006 | Pulsipher |
| 7,028,301 B2 | 4/2006 | Ding |
| 7,062,683 B2 | 6/2006 | Warpenburg |
| 7,131,037 B1 | 10/2006 | LeFaive |
| 7,170,864 B2 | 1/2007 | Matharu |
| 7,350,209 B2 | 3/2008 | Shum |
| 7,392,300 B2 | 6/2008 | Anantharangachar |
| 7,610,512 B2 | 10/2009 | Gerber |
| 7,617,073 B2 | 11/2009 | Trinon |
| 7,685,167 B2 | 3/2010 | Mueller |
| 7,689,628 B2 | 3/2010 | Garg |
| 7,783,744 B2 | 8/2010 | Garg |
| 7,877,783 B1 | 1/2011 | Cline |
| 7,890,802 B2 | 2/2011 | Gerber |
| 7,930,396 B2 | 4/2011 | Trinon |
| 7,933,927 B2 | 4/2011 | Dee |
| 7,941,506 B2 | 5/2011 | Bonal |
| 7,945,860 B2 | 5/2011 | Vambenepe |
| 7,966,398 B2 | 6/2011 | Wiles |
| 8,051,164 B2 | 11/2011 | Peuter |
| 8,082,222 B2 | 12/2011 | Rangarajan |
| 8,151,261 B2 | 4/2012 | Sirota |
| 8,224,683 B2 | 7/2012 | Manos |
| 8,266,096 B2 | 9/2012 | Navarrete |
| 8,346,752 B2 | 1/2013 | Sirota |
| 8,380,645 B2 | 2/2013 | Kowalski |
| 8,457,928 B2 | 6/2013 | Dang |
| 8,478,569 B2 | 7/2013 | Scarpelli |
| 8,554,750 B2 | 10/2013 | Rangaranjan |
| 8,646,093 B2 | 2/2014 | Myers |
| 8,674,992 B2 | 3/2014 | Poston |
| 8,683,032 B2 | 3/2014 | Spinelli |
| 8,689,241 B2 | 4/2014 | Naik |
| 8,743,121 B2 | 6/2014 | De Peuter |
| 8,745,040 B2 | 6/2014 | Kowalski |
| 8,812,539 B2 | 8/2014 | Milousheff |
| 8,818,994 B2 | 8/2014 | Kowalski |
| 8,887,133 B2 | 11/2014 | Behnia |
| 8,907,988 B2 | 12/2014 | Poston |
| 9,015,188 B2 | 4/2015 | Behne |
| 9,015,803 B1* | 4/2015 | Chaganti ................ G06Q 50/14 |
| | | 726/2 |
| 9,037,536 B2 | 5/2015 | Vos |
| 9,137,115 B2 | 9/2015 | Mayfield |
| 9,239,857 B2* | 1/2016 | Trinon ................... G06F 9/542 |
| 9,261,372 B2 | 2/2016 | Cline |
| 9,323,801 B2 | 4/2016 | Morozov |
| 9,412,084 B2 | 9/2016 | Kowalski |
| 9,467,344 B2 | 10/2016 | Gere |
| 9,534,903 B2 | 1/2017 | Cline |
| 9,535,737 B2 | 1/2017 | Joy |
| 9,557,969 B2 | 1/2017 | Sharma |
| 9,613,070 B2 | 4/2017 | Kumar |
| 9,631,934 B2 | 4/2017 | Cline |
| 9,659,051 B2 | 5/2017 | Hutchins |
| 9,792,387 B2 | 10/2017 | George |
| 9,852,165 B2 | 12/2017 | Morozov |
| 9,967,162 B2 | 5/2018 | Spinelli |
| 10,002,203 B2 | 6/2018 | George |
| 2006/0136459 A1* | 6/2006 | Trinon ................... G06Q 10/06 |
| 2014/0280900 A1* | 9/2014 | McDowall ............. H04L 45/02 |
| | | 709/224 |
| 2014/0281873 A1* | 9/2014 | Frew ................... G06F 17/2288 |
| | | 715/229 |
| 2014/0317313 A1* | 10/2014 | Okita ................. H04L 61/2557 |
| | | 709/245 |
| 2015/0205453 A1* | 7/2015 | Carlos ................ H04L 65/4015 |
| | | 715/798 |
| 2015/0281150 A1* | 10/2015 | Masterson ............. G06Q 10/10 |
| | | 715/752 |
| 2016/0048486 A1* | 2/2016 | Lopategui ............. G06F 40/197 |
| | | 715/229 |
| 2017/0185574 A1* | 6/2017 | Fern ..................... G06F 3/04842 |
| 2018/0300304 A1* | 10/2018 | Mullins ................ G06Q 10/101 |
| 2018/0349002 A1* | 12/2018 | Kindelsberger .... G06F 3/04847 |

OTHER PUBLICATIONS

Concurrent Versions System. Wikipedia, Jan. 19, 2018 (downloaded from public web site https://en.wikipedia.org/wiki/Concurrent_Versions_System).

* cited by examiner

DISTRIBUTED EDITING AND VERSIONING FOR GRAPHICAL SERVICE MAPS OF A MANAGED NETWORK

BACKGROUND

Remote management of networks may involve a remote network management platform gathering information regarding the configuration and operational aspects of a managed network. Traditionally, computing devices and applications operating on a managed network were viewed in isolation. Thus, it was difficult to determine the impact that a problem with a particular computing device or application will have on higher-layer services provided by the managed network. Service mapping is a set of operations through which the remote network management platform can discover and organize these computing devices and applications, and represent the relationships therebetween.

SUMMARY

Service mapping facilitates the representation of the hardware and software components that jointly provide a service in a managed network. This may involve visually representing these components and the relationships between them in the form of a service map on a graphical user interface. Doing so allows the relationships to be easily understood. From time to time, this service map may be updated as the hardware and software components contributing to the service change, or in order to correct or otherwise improve the service map.

In some managed networks, especially those that are large, the ability to update the service map (e.g., by way of a graphical user interface) may be granted to numerous users. This introduces a set of potential problems in which several users may be updating the service map at the same time, and possibly making incompatible changes to the service map. Further, any one user may make a change in error but not realize his or her mistake, causing the service map to be in an incorrect state.

The embodiments herein involve a two-phase approach to updating service maps by way of a graphical user interface. Each user may be provided with his or her own private copy of the service map that can be edited as desired. Editing a private copy of the service map does not impact the actual "active" service map. Once a user is ready to commit his or her changes to the service map, there is a specific procedure for doing so. In some cases, this procedure may immediately apply the changes to the active service map, and in others these changes may be submitted for review before they are applied. In this way, the users are unlikely to accidentally make incorrect changes to the active service map and proposed changes are subject to oversight, which reduces the likelihood of incompatible changes being committed by multiple users.

Accordingly, a first example embodiment may involve a remote network management platform that manages a managed network. The managed network may contain a plurality of computing devices that are capable of executing a plurality of applications. The plurality of computing devices and the plurality of applications may be configured to provide a service on behalf of the managed network. The first example embodiment may also include a database, disposed within the remote network management platform, containing a definition of a graph that represents the plurality of computing devices, the plurality of applications, and relationships therebetween that facilitate providing the service. The first example embodiment may also include a computing device, disposed within the remote network management platform. The computing device may be configured to generate and provide for display, on a client device, a graphical user interface. The graphical user interface may include a panel containing an active copy of the graph that was read from the database. The graphical user interface may include a first selectable control that, when selected by way of the graphical user interface, causes the computing device to create an editable, private copy of the graph and causes the computing device to replace the active copy of the graph in the panel with the editable, private copy of the graph. The editable, private copy of the graph may be editable by way of the graphical user interface and edits made to the editable, private copy of the graph do not affect the active copy of the graph. The graphical user interface may include a second selectable control that, when selected by way of the graphical user interface, causes the computing device to update the active copy of the graph with the editable, private copy of the graph, save the active copy of the graph as updated to the database, and display the active copy of the graph as updated in the panel.

A second example embodiment may involve obtaining, by a computing device and from a database both disposed within a remote network management platform that manages a managed network, a definition of a graph that represents a plurality of computing devices disposed within the managed network, a plurality of applications configured to execute on the plurality of computing devices, and relationships therebetween that facilitate providing a service on behalf of the managed network. The second example embodiment may also involve generating and providing for display, by the computing device and on a client device, a graphical user interface. The graphical user interface may include a panel containing an active copy of the graph that was obtained from the database. The graphical user interface may also include a first selectable control and a second selectable control. The second example embodiment may also involve receiving, by the computing device and by way of the graphical user interface, an indication that the first selectable control was selected. The second example embodiment may also involve, possibly in response to receiving the indication that the first selectable control was selected, the computing device creating an editable, private copy of the graph and replacing the active copy of the graph in the panel with the editable, private copy of the graph. The editable, private copy of the graph may be editable by way of the graphical user interface and edits made to the editable, private copy of the graph do not affect the active copy of the graph. The second example embodiment may also involve receiving, by the computing device and by way of the graphical user interface, an indication that the second selectable control was selected. The second example embodiment may also involve, possibly in response to receiving the indication that the second selectable control was selected, the computing device updating the active copy of the graph with the editable, private copy of the graph, saving the active copy of the graph as updated to the database, and causing the client device to display, in the panel, the active copy of the graph as updated.

In a third example embodiment, an article of manufacture may include a non-transitory computer-readable medium, having stored thereon program instructions that, upon execution by a computing system, cause the computing system to perform operations in accordance with the first and/or second example embodiment.

In a fourth example embodiment, a computing system may include at least one processor, as well as memory and program instructions. The program instructions may be stored in the memory, and upon execution by the at least one processor, cause the computing system to perform operations in accordance with the first and/or second example embodiment.

In a fifth example embodiment, a system may include various means for carrying out each of the operations of the first and/or second example embodiment.

These as well as other embodiments, aspects, advantages, and alternatives will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1:
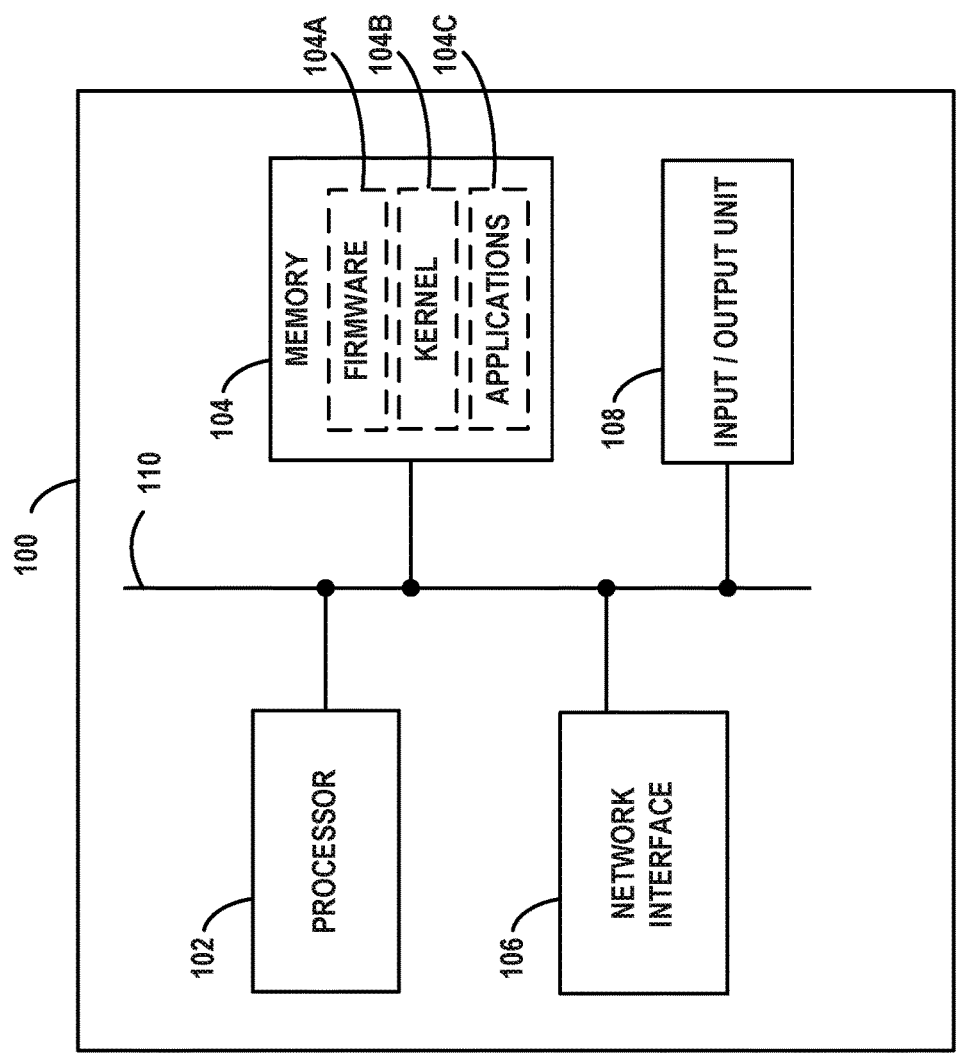
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. INTRODUCTION

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its business, innovate, and meet regulatory requirements. The enterprise may find it difficult to integrate, streamline and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflow for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data is stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

The following embodiments describe architectural and functional aspects of example aPaaS systems, as well as the features and advantages thereof.

II. EXAMPLE COMPUTING DEVICES AND CLOUD-BASED COMPUTING ENVIRONMENTS

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing device 100. Applications 104C may be one or more userspace software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with example computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more instances of computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
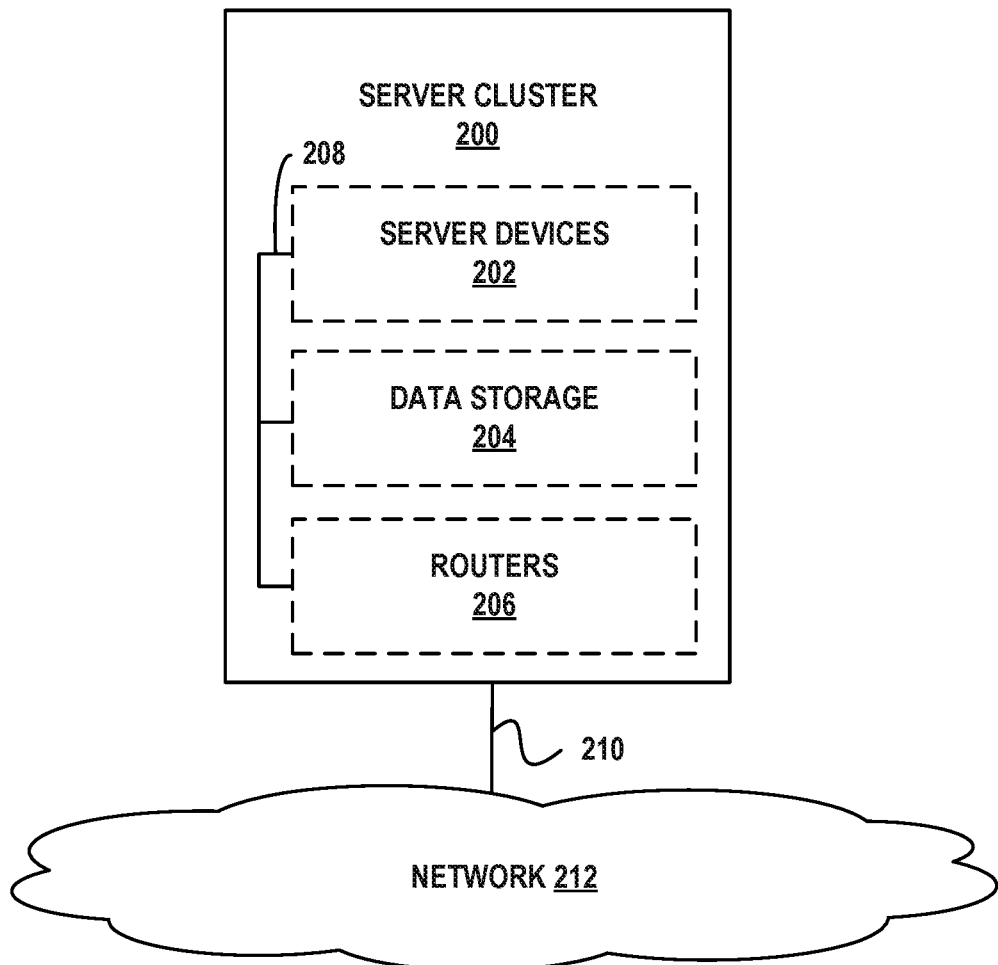
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of cluster data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via cluster network 208, and/or (ii) network communications between the server cluster 200 and other devices via communication link 210 to network 212.

Additionally, the configuration of cluster routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from cluster data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JavaScript, and so on. Computer program code written in these languages may facilitate the providing of web pages to client devices, as well as client device interaction with the web pages.

III. EXAMPLE REMOTE NETWORK MANAGEMENT ARCHITECTURE

Figure 3:
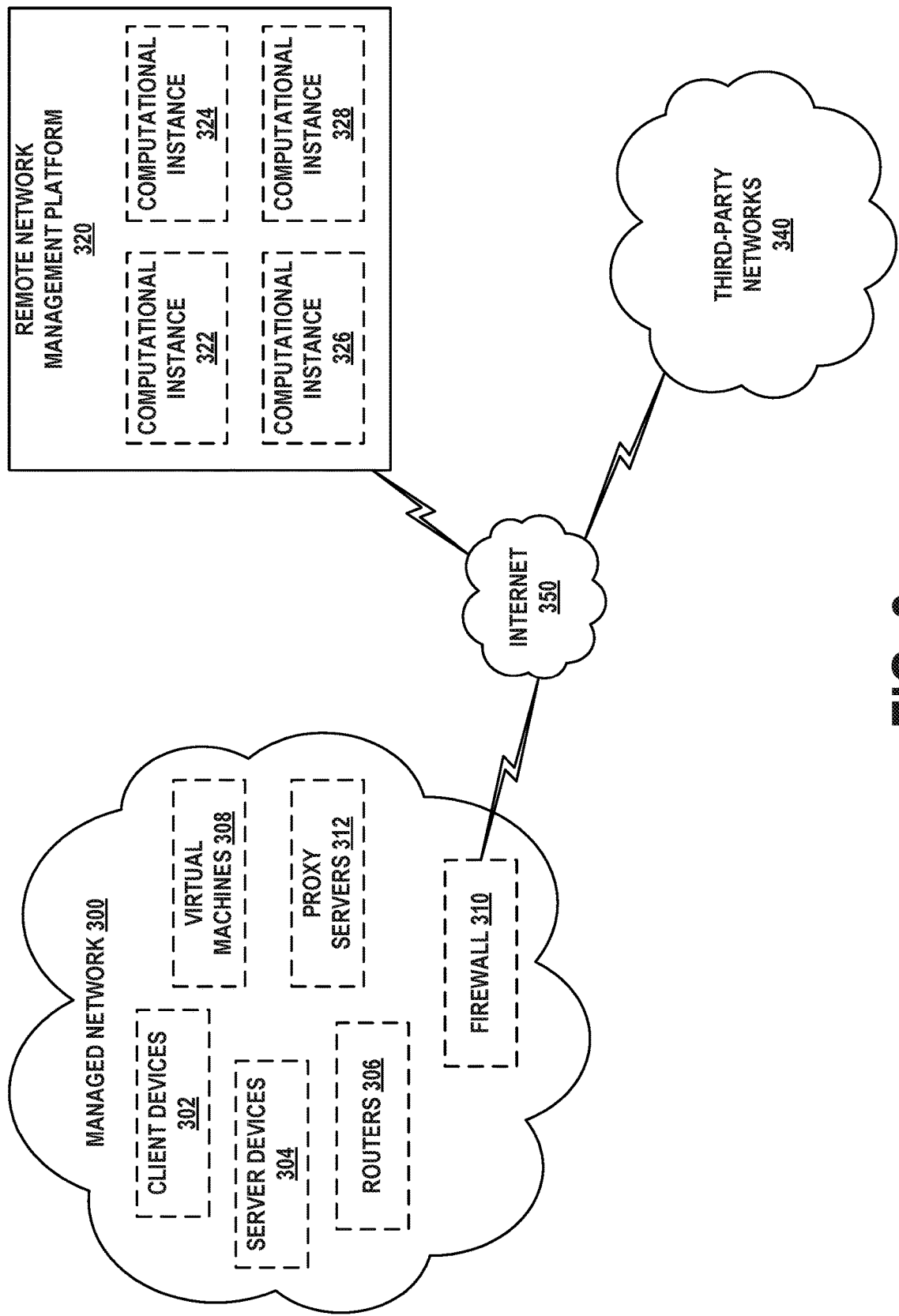
FIG. 3 depicts a remote network management architecture, in accordance with example embodiments.

FIG. 3 depicts a remote network management architecture, in accordance with example embodiments. This architecture includes three main components, managed network 300, remote network management platform 320, and third-party networks 340, all connected by way of Internet 350.

Managed network 300 may be, for example, an enterprise network used by a business for computing and communications tasks, as well as storage of data. Thus, managed network 300 may include various client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server device that facilitates communication and movement of data between managed network 300, remote network management platform 320, and third-party networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of third-party networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

Remote network management platform 320 is a hosted environment that provides aPaaS services to users, particularly to the operators of managed network 300. These services may take the form of web-based portals, for instance. Thus, a user can securely access remote network management platform 320 from, for instance, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these instances may represent a set of web portals, services, and applications (e.g., a wholly-functioning aPaaS system) available to a particular customer. In some cases, a single customer may use multiple computational instances. For example, managed network 300 may be an enterprise customer of remote network management platform 320, and may use computational instances 322, 324, and 326. The reason for providing multiple instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation.

The multi-instance architecture of remote network management platform 320 is in contrast to conventional multi-tenant architectures, over which multi-instance architectures have several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In order to support multiple computational instances in an efficient fashion, remote network management platform 320 may implement a plurality of these instances on a single hardware platform. For example, when the aPaaS system is implemented on a server cluster such as server cluster 200, it may operate a virtual machine that dedicates varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

Third-party networks 340 may be remote server devices (e.g., a plurality of server clusters such as server cluster 200) that can be used for outsourced computational, data storage, communication, and service hosting operations. These servers may be virtualized (i.e., the servers may be virtual machines). Examples of third-party networks 340 may include AMAZON WEB SERVICES® and MICROSOFT® Azure. Like remote network management platform 320, multiple server clusters supporting third-party networks 340 may be deployed at geographically diverse locations for purposes of load balancing, redundancy, and/or high availability.

Managed network 300 may use one or more of third-party networks 340 to deploy applications and services to its clients and customers. For instance, if managed network 300 provides online music streaming services, third-party networks 340 may store the music files and provide web interface and streaming capabilities. In this way, the enterprise of managed network 300 does not have to build and maintain its own servers for these operations.

Remote network management platform 320 may include modules that integrate with third-party networks 340 to expose virtual machines and managed services therein to managed network 300. The modules may allow users to request virtual resources and provide flexible reporting for third-party networks 340. In order to establish this functionality, a user from managed network 300 might first establish an account with third-party networks 340, and request a set of associated resources. Then, the user may enter the account information into the appropriate modules of remote network management platform 320. These modules may then automatically discover the manageable resources in the account, and also provide reports related to usage, performance, and billing.

Internet 350 may represent a portion of the global Internet. However, Internet 350 may alternatively represent a different type of network, such as a private wide-area or local-area packet-switched network.

Figure 4:
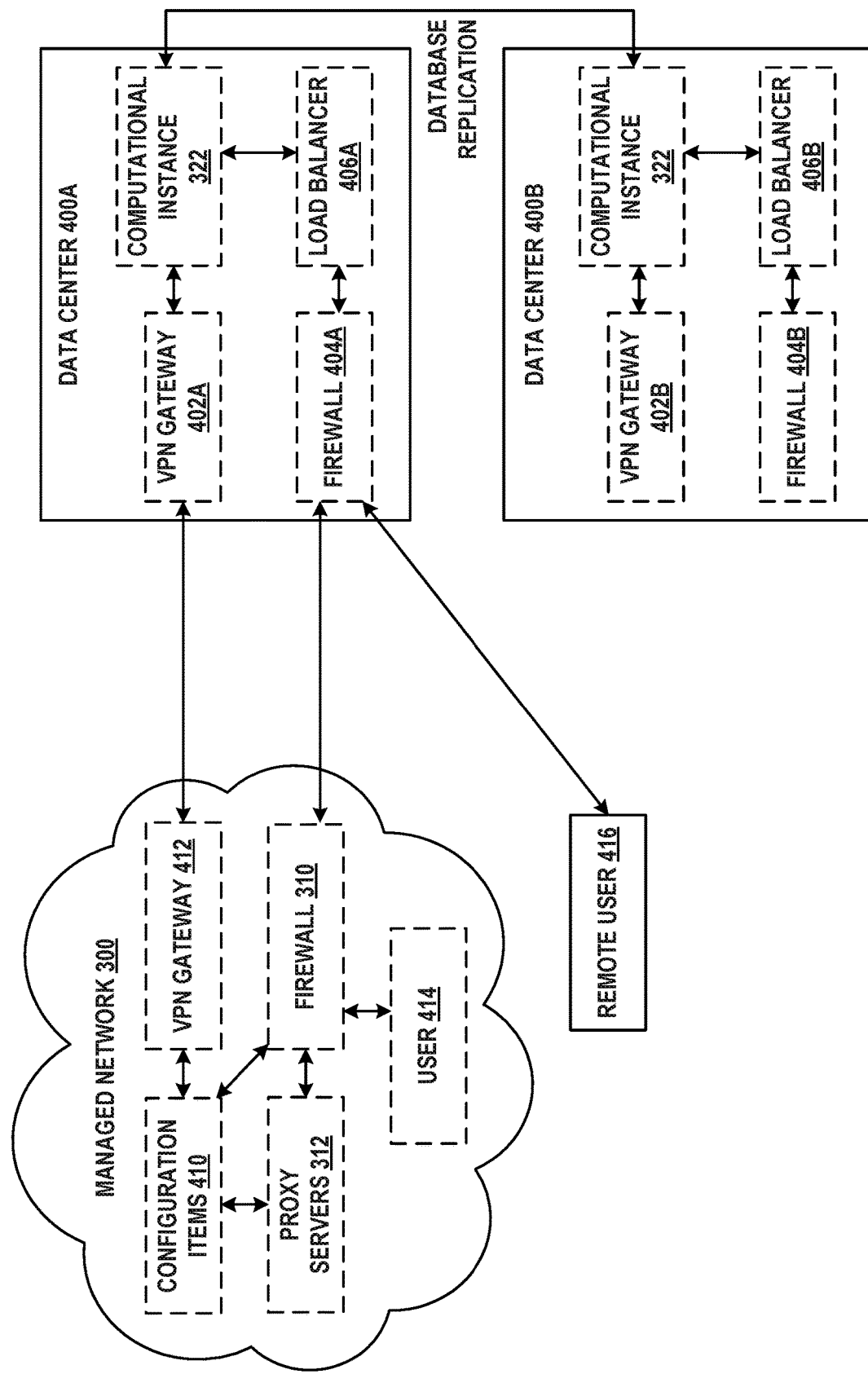
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. EXAMPLE DEVICE, APPLICATION, AND SERVICE DISCOVERY

In order for remote network management platform 320 to administer the devices, applications, and services of managed network 300, remote network management platform 320 may first determine what devices are present in managed network 300, the configurations and operational statuses of these devices, and the applications and services provided by the devices, and well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purpose of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
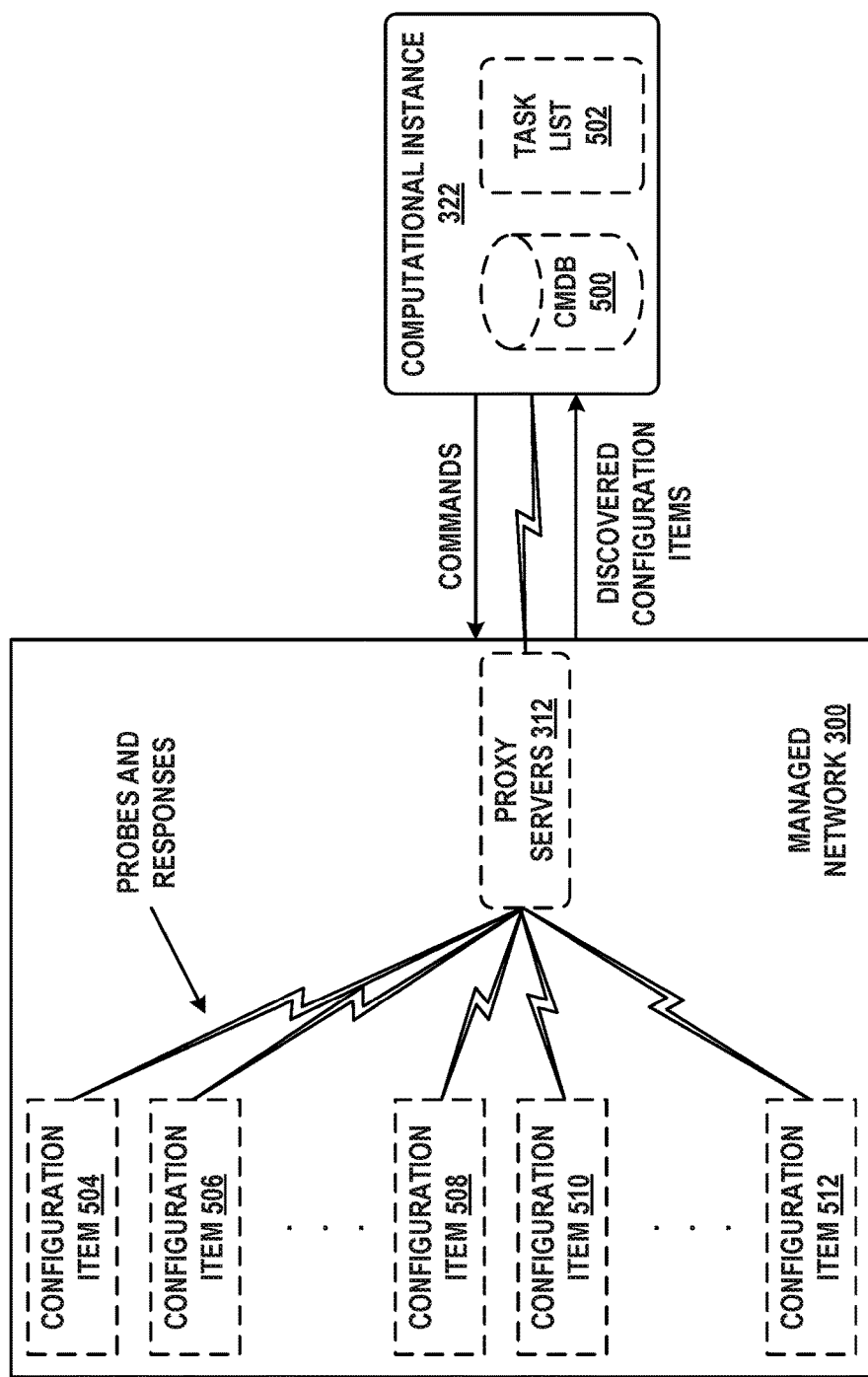
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, third-party networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For instance, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
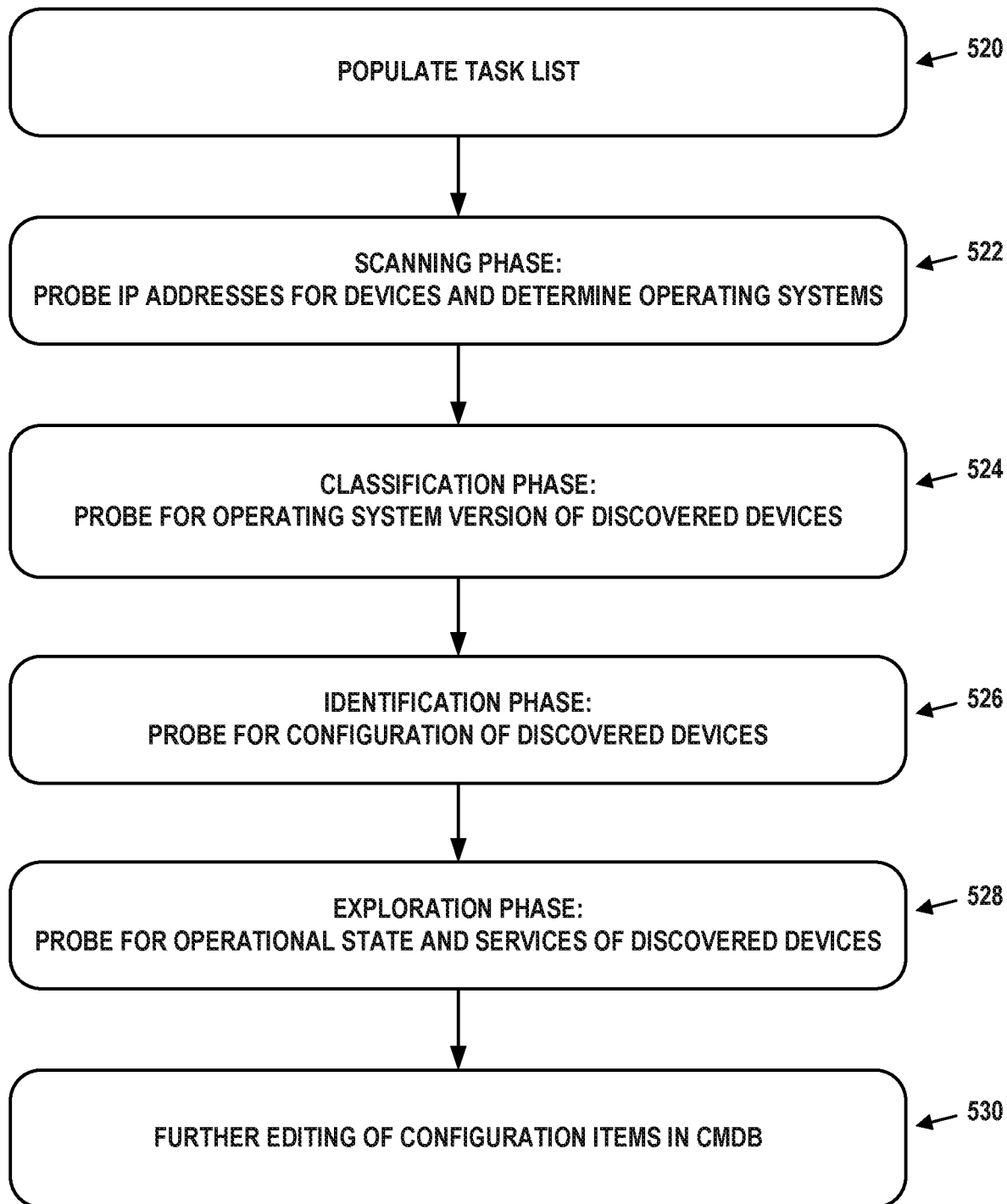
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are for purpose of example. Discovery may be a highly configurable procedure that can have more or fewer phases, and the operations of each phase may vary. In some cases, one or more phases may be customized, or may otherwise deviate from the exemplary descriptions above.

V. EXAMPLE SERVICE MAPPING

Service mapping may involve a computational instance obtaining information related to sets of interconnected computing devices and applications, operating on a managed network, that are configured to provide a service. This service may either be provided internally to the managed network (e.g., an organizational email service) or externally to customers of the managed network (e.g., an external web site). Service mapping builds viewable maps of the configuration items (e.g., the computing devices, applications, and any related configuration information or profiles) used to provide the service. Dependencies between these configuration items may be based on relationships between the computing devices and applications.

Thus, a service map may be a visual representation on a web-based GUI, for instance, that depicts particular applications operating on particular computing devices in the managed network as nodes in a graph. The edges of the graph may represent physical and/or logical network connectivity between these nodes. This visual representation allows users to rapidly determine the impact of a problematic configuration item on the rest of the service. For instance, rather than viewing, in isolation, the properties of a database application, this application can be represented as having connections to other applications and the computing devices that rely upon or support the application. Thus, if the database is exhibiting a problem (e.g., running out of storage capacity), the impacted service(s) can be efficiently determined.

Discovery procedures may be used, at least in part, to determine the relationships between computing devices and applications that define services. Alternatively or additionally, services and/or components thereof may be manually defined after discovery has at least partially completed. From this information, a service map can be derived.

A. Example Email Service Map

Figure 6:
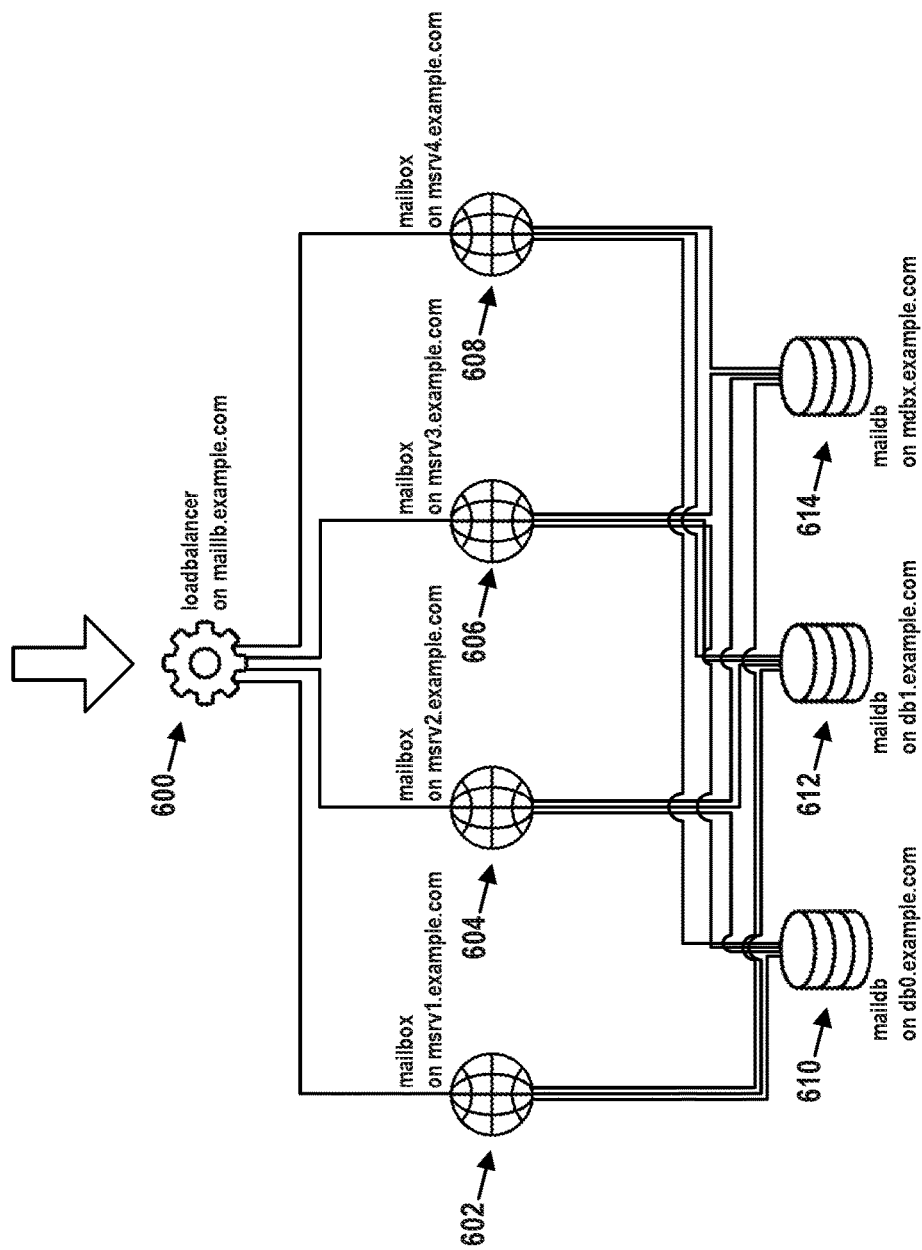
FIG. 6 depicts a service map representing computing devices and applications, in accordance with example embodiments.

FIG. 6 provides an example service map including applications and computing devices that make up an email service that supports redundancy and high-availability. This service map may be generated for display on the screen of a computing device. As noted above, the nodes in the service map represent applications operating on computing devices. These nodes may take the form of icons related to the respective functions of the applications or computing devices.

The entry point to the email service, as designated by the large downward-pointing arrow, may be load balancer 600. Load balancer 600 may be represented with a gear icon, and may operate on a device with host name mail1b.example.com. This host name, as well as other host names herein, may be a partially-qualified or fully-qualified domain name in accordance with DNS domain syntax.

Load balancer 600 may distribute incoming requests across mailbox applications 602, 604, 606, and 608 operating on mail server devices msrv1.example.com, msrv2.example.com, msrv3.example.com, and msrv4.example.com, respectively. These mail server devices may be represented by globe icons on the service map. Connectivity between load balancer 600 and each of mailbox applications 602, 604, 606, and 608 is represented by respective edges.

Mailbox applications 602, 604, 606, and 608 may, for instance, respond to incoming requests for the contents of a user's mail folder, for the content of an individual email message, to move an email message from one folder to another, or to delete an email message. Mailbox applications 602, 604, 606, and 608 may also receive and process incoming emails for storage by the email service. Other email operations may be supported by mailbox applications 602, 604, 606, and 608. For sake of example, it may be assumed that mailbox applications 602, 604, 606, and 608 perform essentially identical operations, and any one of these applications may be used to respond to any particular request.

The actual contents of users' email accounts, including email messages, folder arrangements, and other settings, may be stored in one or more of mail database applications 610, 612, and 614. These applications may operate on database server devices db0.example.com, db1.example.com, and mdbx.example.com, which are represented by database icons on the network map. Connectivity between mailbox applications 602, 604, 606, and 608 and each of mail database applications 610, 612, and 614 also is represented by respective edges.

Mailbox applications 602, 604, 606, and 608 may retrieve requested data from mail database applications 610, 612, and 614, and may also write data to mail database applications 610, 612, and 614. The data stored by mail database applications 610, 612, and 614 may be replicated across all of the database server devices.

As an example of the operation of the email service depicted by the map of FIG. 6A, an incoming email message may arrive at load balancer 600. This email message may be addressed to an email account (e.g., user@example.com) supported by the email service. Load balancer 600 may select one of mailbox applications 602, 604, 606, and 608 to store the email message. For instance, load balancer 600 may make this selection based on a round-robin procedure, the loads (e.g., CPU, memory, and/or network utilization) reported by mailbox applications 602, 604, 606, and 608, randomly, or some combination thereof.

Assuming that load balancer 600 selects mailbox application 604, load balancer 600 then transmits the email message to mailbox application 604. Mailbox application 604 may perform any necessary mail server functions to process the email message, such as verifying that the addressee is supported by the email server, validating the source of the email message, running the email message through a spam filter, and so on. After these procedures, mailbox application 604 may select one of mail database applications 610, 612, and 614 for storage of the email message. Similar to load balancer 600, mailbox application 604 may make this selection based on various criteria, including load on mail database applications 610, 612, and 614.

Assuming that mailbox application 604 selects mail database application 610, mailbox application 604 then transmits the email message to mail database application 610. Mail database application 610 may perform any necessary mail database functions to process and store the email message. For instance, mail database application 610 may store the message as a compressed file in a file system, and update one or more database tables to represent characteristics of the email message (e.g., the sender, the size of the message, its importance, where the file is stored, and so on).

When a mail client application (not shown) requests a copy of the email message, this request may also be received by load balancer 600. Load balancer 600 may select one of mailbox applications 602, 604, 606, and 608 to retrieve the email message. This selection may be made according to various criteria, such as any of those discussed above. Assuming that load balancer 600 selects mailbox application 608, mailbox application 608 then selects one of mail database applications 610, 612, and 614. Assuming that mailbox application 608 selects mail database application 612, mailbox application 608 requests the email message from mail database application 612.

Since data is replicated across mail database applications 610, 612, and 614, mail database application 612 is able to identify and retrieve the requested email message. For instance, mail database application 612 may look up the email message in a database table, from the table determine where the email message is stored in its file system, find the email message in the file system, and provide the email message to mailbox application 608. Mailbox application 608 may then transmit the email message to the mail client application.

The arrangement of FIG. 6 may vary. For example, more or fewer load balancers, mailbox applications, mail database applications, as well as their associated devices, may be present. Furthermore, additional devices may be included, such as storage devices, routers, switches, and so on. Additionally, while FIG. 6 is focused on an example email service, similar network maps may be generated and displayed for other types of services, such as web services, remote access services, automatic backup services, content delivery services, and so on.

Additionally, nodes representing devices of the same type or operating the same application or type of application may be placed at the same horizontal level, as in FIG. 6. Nodes representing the entry point of the represented service may be placed at the top of the map, and the vertical arrangement of nodes may roughly correspond to the order in which the nodes become involved in carrying out operations of the service. Nonetheless, as the number of nodes and connections grows, such arrangements may vary for purposes of making presentation of the network map readable.

B. Generating a Service Map

The service map displayed in FIG. 6 may be discovered and generated according to various rules. Service mapping may begin or be triggered to begin when a user provides a service mapping application in a computational instance with an address (e.g., a URL, domain name, or IP address) of a service's entry point. Based on this input, the CMDB may be queried to determine whether one or more computing devices associated with the address exist therein.

If not, pattern-based discovery may be invoked to determine the characteristics of these computing devices and the applications executing on them. Then, service mapping further carries out discovery for any applications related to these newly discovered configuration items. Not unlike the procedures described above, service mapping may involve the computational instance issuing commands to a proxy server in the managed network, and the proxy server undertaking discovery.

Alternatively or additionally, traffic-based service mapping may be carried out to discover related computing devices and applications by analyzing network traffic. In some cases, traffic-based service mapping can find configuration items that the computational instance fails to find using pattern-based service mapping. Network traffic logs, such as those from a commercially-available network traffic analyzer, may be collected and stored. Traffic-based service mapping processes these records to identify packet flows and connections between specific applications that were executing on specific computing devices. For instance, if the network traffic logs show that there are persistent or ongoing connections between a web server application and a database application, then these two applications may be considered to be part of the same service. Traffic-based service mapping can also use discovery procedures to log on to computing devices and invoke commands (e.g., netstat or lsof) to determine connections involving a particular computing device.

Once service mapping completes, information regarding the discovered computing device(s) and application(s) is stored in the CMDB.

VI. EXAMPLE SERVICE MAP EDITOR

Even though the combination of discovery, pattern-based service mapping, and traffic-based service mapping is a powerful tool for defining service maps, this tool might not be sufficient in all cases. For instance, pattern-based service mapping might not result in discovery of all applications associated with a service, whereas traffic-based service discovery might be over-inclusive. Moreover, when a minor change is to be made to a service map, it may be inefficient to invoke discovery to carry out this change.

Thus, a visual service map editor, facilitated by a GUI, may be offered to users so that they can manually edit service maps. FIGS. 7A-7D provide example embodiments of such a GUI.

Figure 7A:
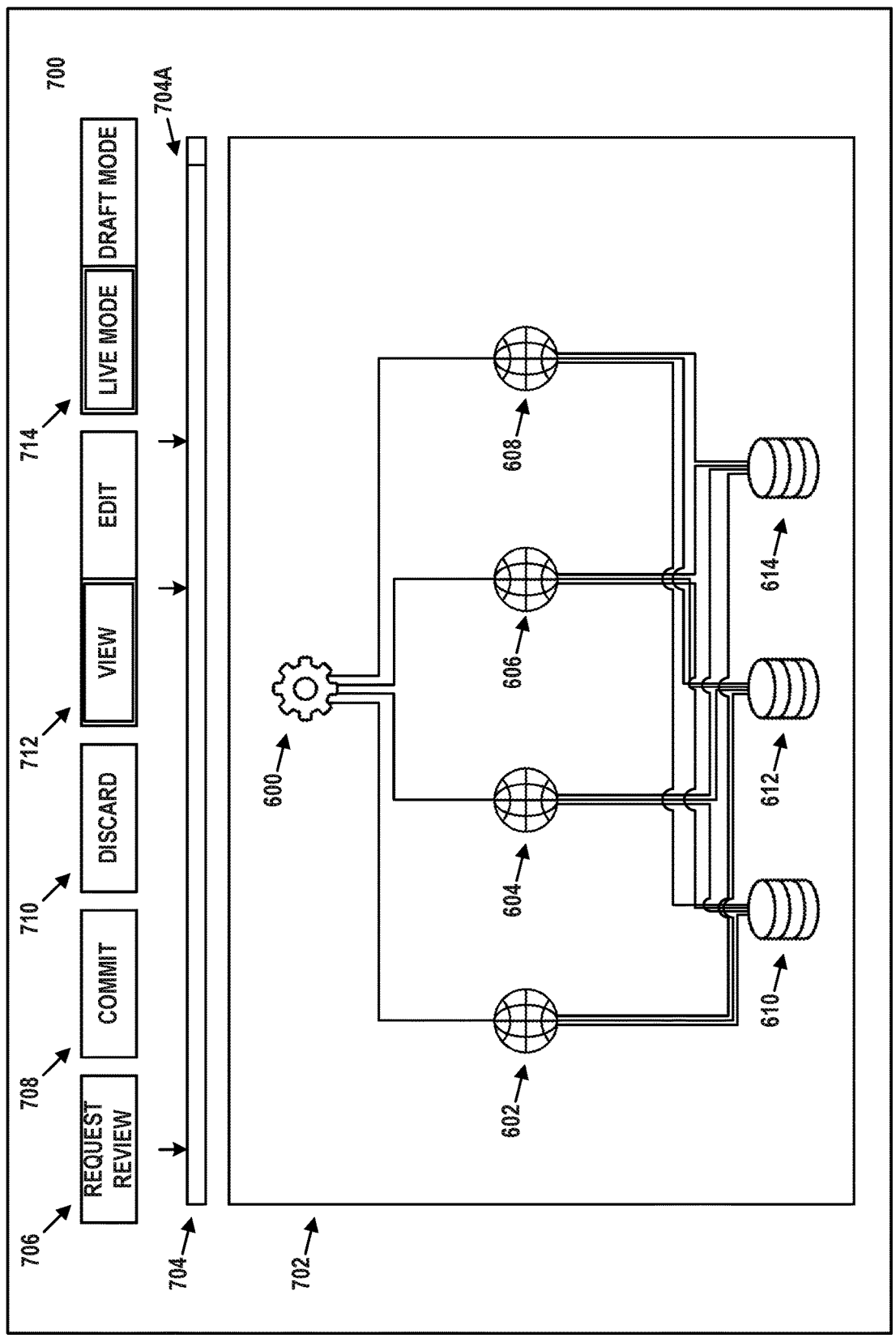
FIG. 7A depicts a graphical user interface representation of a service map, in accordance with example embodiments.

FIG. 7A depicts an example screen 700 of the GUI. Screen 700 includes panel 702, history timeline 704, and controls 706, 708, 710, 712, and 714. Screen 700 is merely for purpose of example, and other arrangements of the GUI fall within the disclosed embodiments.

Panel 702 displays a service map. In this case, panel 702 is displaying the same service map as FIG. 6, but with the textual annotations removed for simplicity. As the user edits this service map, views other instances of the service map by way of timeline 704, or switches between a private copy and the active copy of the service map, panel 702 may be updated accordingly.

History timeline 704 may represent states of and changes to the service map displayed in panel 702 over time. History timeline 704 may include the present moment (represented by line 704A), as well as past moments to the left of line 704A. Thus, as one moves left from line 704A on history timeline 704, history timeline 704 represents events and states further in the past.

The three down-arrows disposed above history timeline 704 may represent discrete changes made and committed to history timeline 704. Thus, the part of history timeline 704 to the left of the leftmost down-arrow may represent one state of the service map, the part of history timeline 704 between the leftmost and the middle down-arrows may represent another state of history timeline 704, and so on. Thus, by clicking on, clicking nearby, or otherwise selecting a point on history timeline 704, panel 702 may be updated to display the service map as it existed at that point in time.

Each of controls 706, 708, 710, 712, and 714 can be used to assist the user in editing and managing versions of a service map. Starting on the right of FIG. 7A, live mode/draft mode control 714 has two buttons that allow the user to toggle between live mode (in which the active service map is shown) and draft mode (in which a draft service map is shown). Thus, exactly one of these two buttons of control 714 is depressed at any given time.

In some embodiments, toggling from live mode to draft mode will create an editable, private copy of the active service map for the user, and display this newly-created map in panel 702. Alternatively, if the user already has one or more editable, private copies of a service map saved or open, the GUI may display, for example, a pop up window giving the user an option to create a new copy of the active service map or continue editing one of the existing copies.

In some embodiments, toggling from draft mode to live mode will automatically save any editable, private copy of a service map that was displayed in panel 702, and update panel 702 to display the active service map. Alternatively, toggling from draft mode to live mode might just update panel 702 to display the active service map without saving the editable, private copy. In some embodiments, a separate control not shown in FIG. 7A (e.g., a save button) may be used to save editable, private copies of a service map.

View/edit control 712 has two buttons that allow the user to toggle between viewing a service map and editing a service map that is displayed in panel 702. Exactly one of these two buttons of control 712 is depressed at any given time. A user viewing a service map may be prevented from making any changes to the service map. A user editing the service map may be able to make changes to the service map. For instance, when in edit mode, screen 700 may display various graphical editing tools, such as drawing tools, text tools, selectable icons, and so on. These tools can be used to edit the service map that is displayed in panel 702.

In some embodiments, each service map may be identified with one or more users who are in charge of (e.g., "own") the service map. For instance, the active service map may have an owner who is responsible for maintaining its accuracy. When another user, perhaps by way of control 712 or control 714, creates and/or edits their private copy of the service map, the owner of the active service map may be notified that such a copy exists. The owner may further be able to view these copies of the service map.

View/edit control 712 may operate regardless of whether the user is in live mode or draft mode per control 714. In some cases, for a user whose privileges indicate that they are not permitted to edit a particular service map being displayed in panel 702 (e.g., the active service map), the edit side of control 712 may be deactivated (e.g., "grayed out") so that it cannot be activated. Thus, the user would only be able to view this service map.

Discard control 710 may be a button that, when activated, causes any service map being displayed in panel 702 to be deleted. In some cases, activation of discard control 710 may cause the GUI to display, for example, a pop up window asking the user whether the user is sure that the service map should be discarded. A user with insufficient privileges may be prevented from discarding the active service map, and may only be able to discard an editable, private copy of a service map associated with that user.

Commit control 708 may be a button that, when activated, updates the active service map with an editable, private copy of a service map displayed in panel 702, and displays the active service map as updated. In some cases, activation of commit control 708 may cause the GUI may display, for example, a pop up window asking the user whether the user is sure that the active service map should be updated. A user with insufficient privileges may be prevented from updating the active service map, and this control may be deactivated (e.g., "grayed out") so that it cannot be activated.

In some cases, after control 708 is activated, the user or the owner of the active service map may be prompted to carry out a graphical merge procedure. Panel 702 may represent the changes between the editable, private copy of the service map and the active service map. For instance, these two versions of the service map may be shown side by side or the changes may be indicated in some other way (e.g., a single service map may be shown with changes represented with a different color). The user may manually approve or discard each discrete change. In this fashion, aspects of both service maps may eventually be used to update the active service map.

Request review control 706 may be a button that, when activated, causes a representation of an editable, private copy of a service map displayed in panel 702 to be transmitted to another user for approval (e.g., the owner of the active service map). For instance, the user viewing screen 700 might not have sufficient privileges to update the active service map (e.g., commit control 708 may be "grayed out") or might want to have another individual review the editable, private copy of the service map before updating the active service map. Regardless, the reviewing user may be notified of the requested review (e.g., by way of email, instant message, or another type of notification) and may be prompted to view the editable, private copy of the service map. The reviewing user may be able to approve this service map by activating a control similar to or the same as commit control 708, reject the service map, or make further edits to the service map. A rejected service map may be sent back to the user that requested review with or without edits.

In FIG. 7A, the GUI is in live mode (i.e., live mode is toggled in control 714) and is also set to view the service map displayed in panel 702 (i.e., view is toggled in control 712). Thus, the service map in panel 702 is the active service map and the user cannot edit it as of yet.

FIG. 7B depicts screen 700 again, but this time in draft mode (i.e., draft mode is toggled in control 714) and also set to edit the service map displayed in panel 702 (i.e., edit is toggled in control 712). Thus, the service map in panel 702 is an editable, private copy of the active service map and the user is permitted to edit this copy. In some embodiments, control 714 can furthered be toggled between live mode (in which the active service map is shown) and draft mode (in which the editable, private copy of the service map is shown). In alternative embodiments, an editable, private copy of the active service map may be created with a control not shown in the figures, such as a button labelled "copy active map", for example.

Figure 7B:
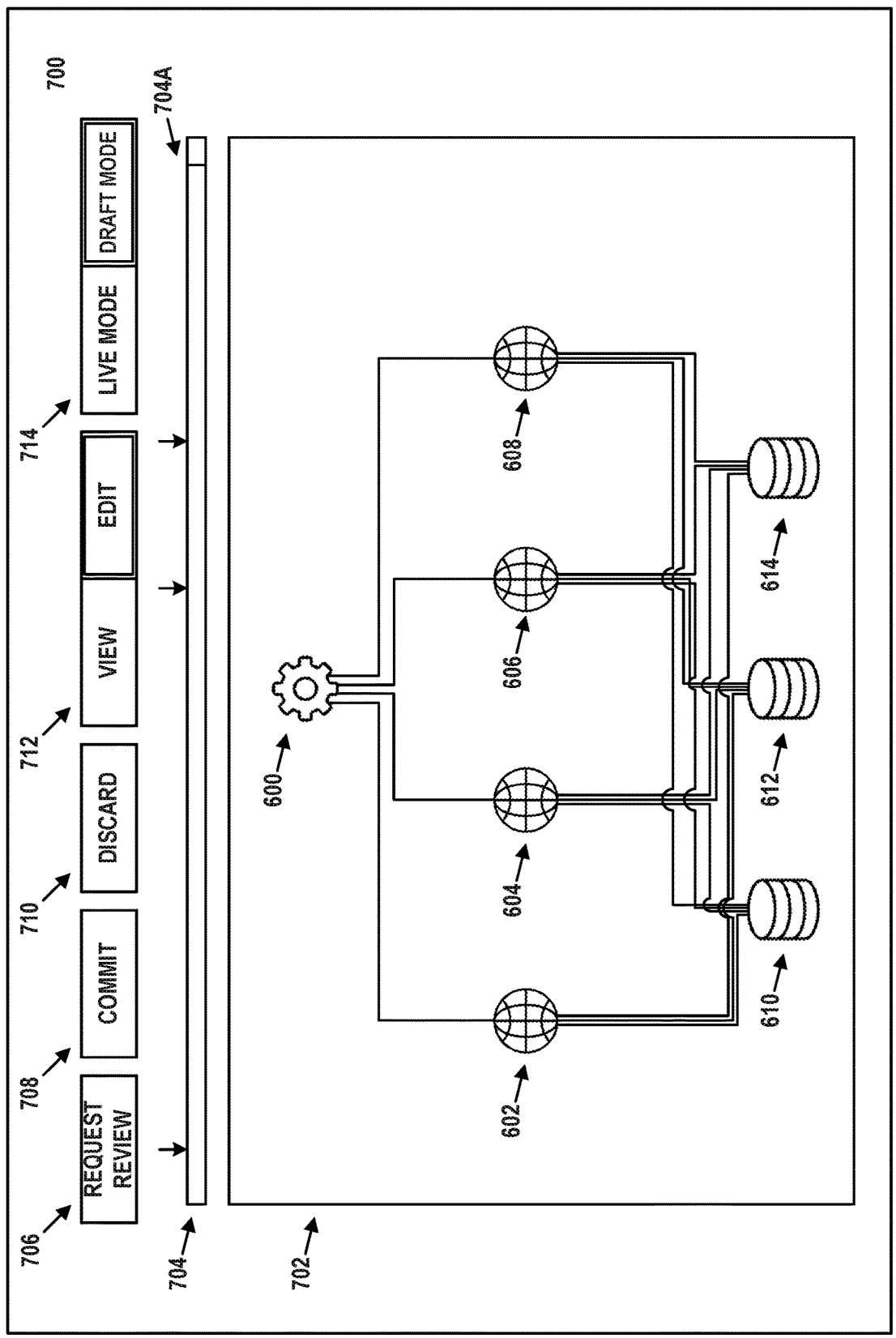
FIG. 7B depicts a graphical user interface representation of a service map, in accordance with example embodiments.
Figure 7C:
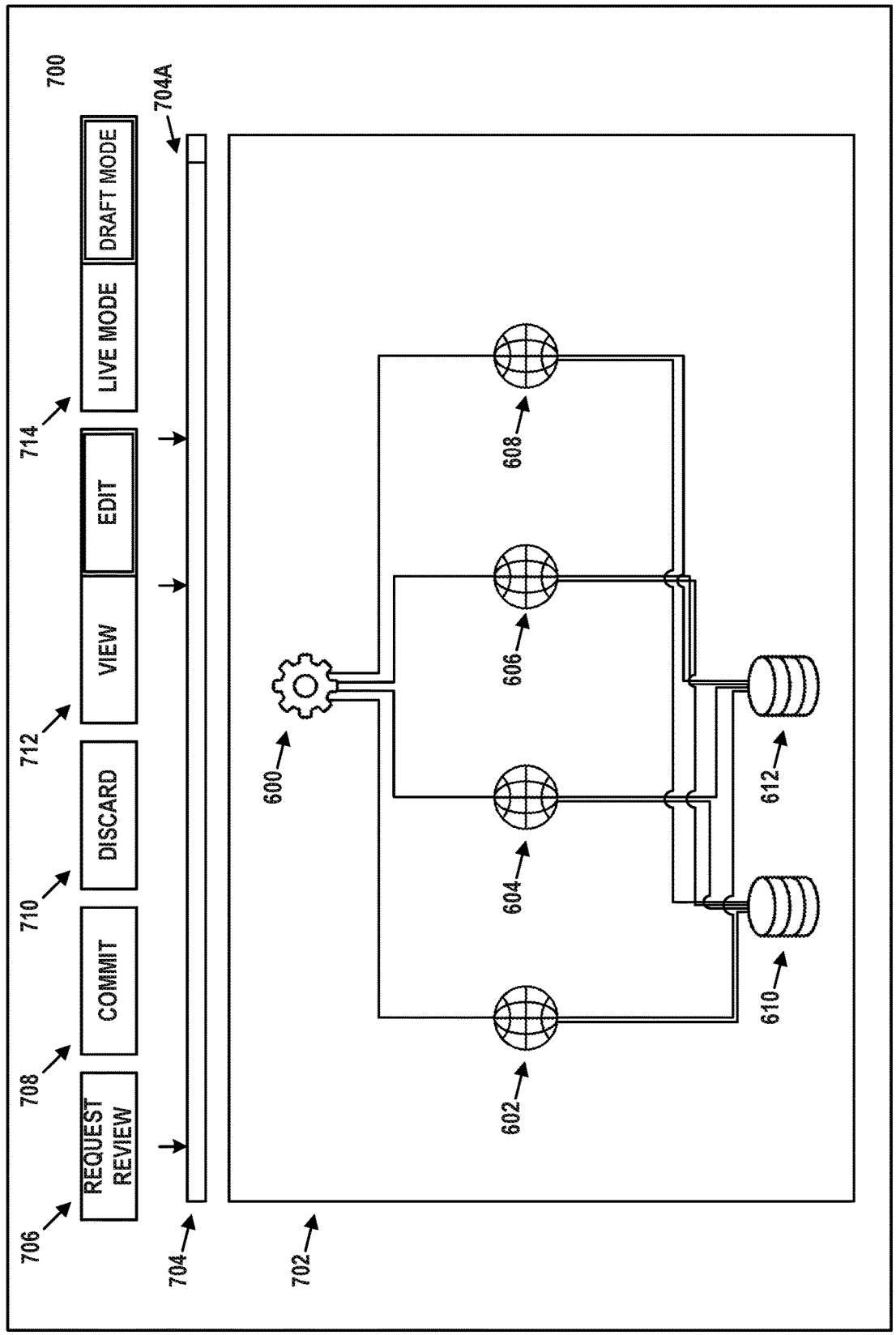
FIG. 7C depicts a graphical user interface representation of a service map, in accordance with example embodiments.

FIG. 7C also depicts screen 700. Similar to FIG. 7B, the user interface is in draft mode (i.e., draft mode is toggled in control 714) and also set to edit the service map displayed in panel 702 (i.e., edit is toggled in control 712). The service map displayed in panel 702, however, has been edited to remove mail database application 614. Accordingly, the connections between mail database application 614 and mailbox applications 602, 604, 606, and 608 have also been removed. A user can then activate the commit control 708, which can update the active service map with the editable, private copy of the service map displayed in panel 702. In this fashion, the active service map is changed and the editable, private copy of the service map, may be automatically saved or discarded. Additionally, activation of control 708 may also update history timeline 704 to mark the time at which this change to the active service map occurred.

Figure 7D:
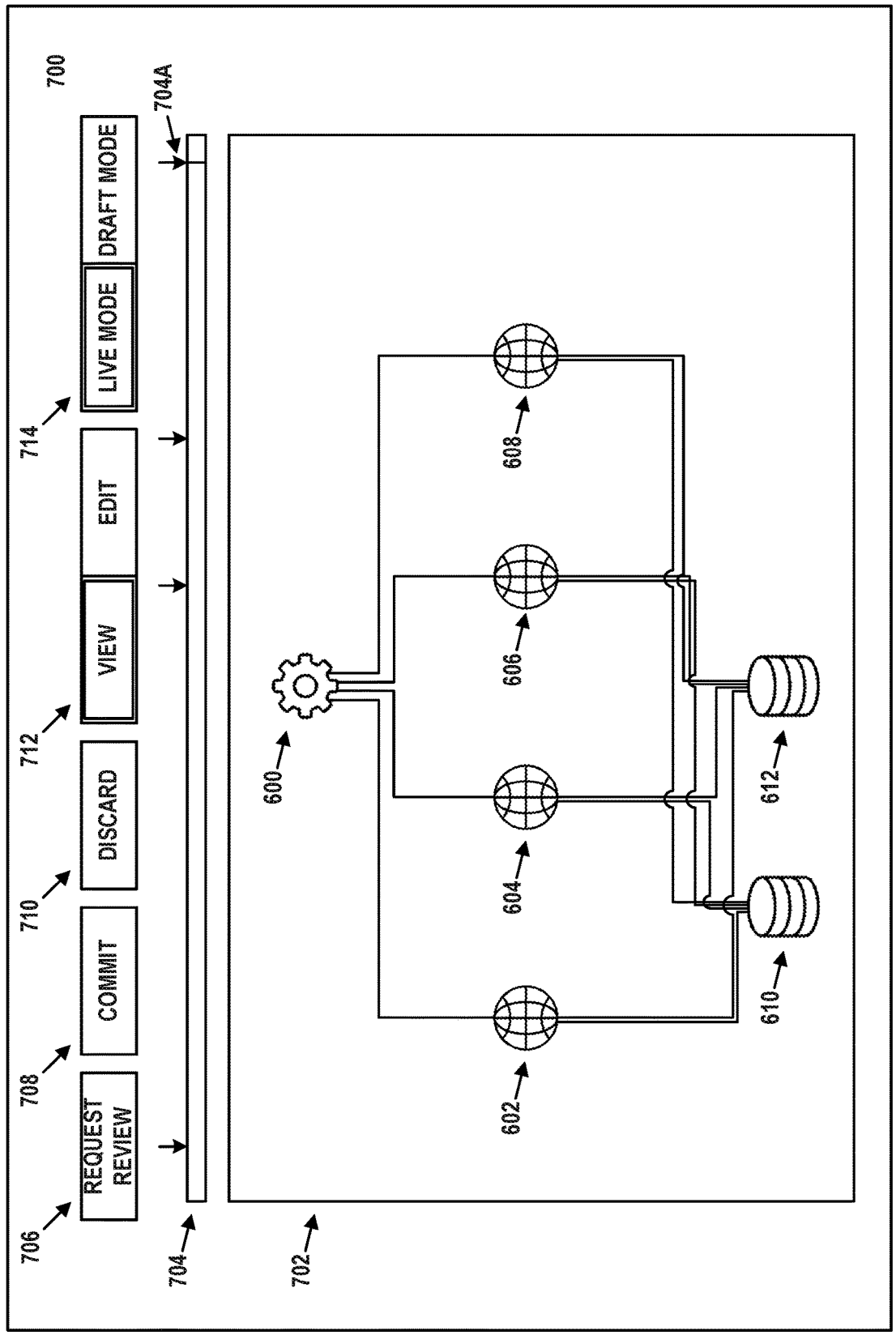
FIG. 7D depicts a graphical user interface representation of a service map, in accordance with example embodiments.

To that point, FIG. 7D depicts an example of what screen 700 might look like after control 708 is activated. The user interface is once again in live mode (i.e., live mode is toggled in control 714) and also set to view the service map displayed in panel 702 (i.e., view is toggled in control 712). Panel 702 displays the updated service map, with the edits previously committed. Additionally, a new down-arrow has been placed at line 704A to indicate that at this point in time a change to the active service map was committed.

Notably, FIGS. 7A-7D, when considered in order, depict a sequence of events. In FIG. 7A, a user is viewing an active service map. The user desires to update or change this service map, so the user activated control 714 to toggle screen 700 into draft mode. FIG. 7B show the result of doing so, with the user being presented with an editable, private copy of the active service map. FIG. 7C depicts the result of the user making an edit to this editable, private copy, and FIG. 7D depicts the result of the user committing the changes to update (or replace) the active service map.

Nonetheless, other embodiments are possible. For instance, the user may be able to maintain more than one editable, draft copy of a service map. These copies may be saved, and the user may be able to edit any of these copies as desired. The user may also be able to commit any of them, causing the active service map to be updated (or replaced) accordingly.

Considered further, the user interface described herein may allow a model of service map management that contains a main line (the active service map) and zero or more branches per user (the editable, private copies). This arrangement is depicted in FIG. 8.

Figure 8:
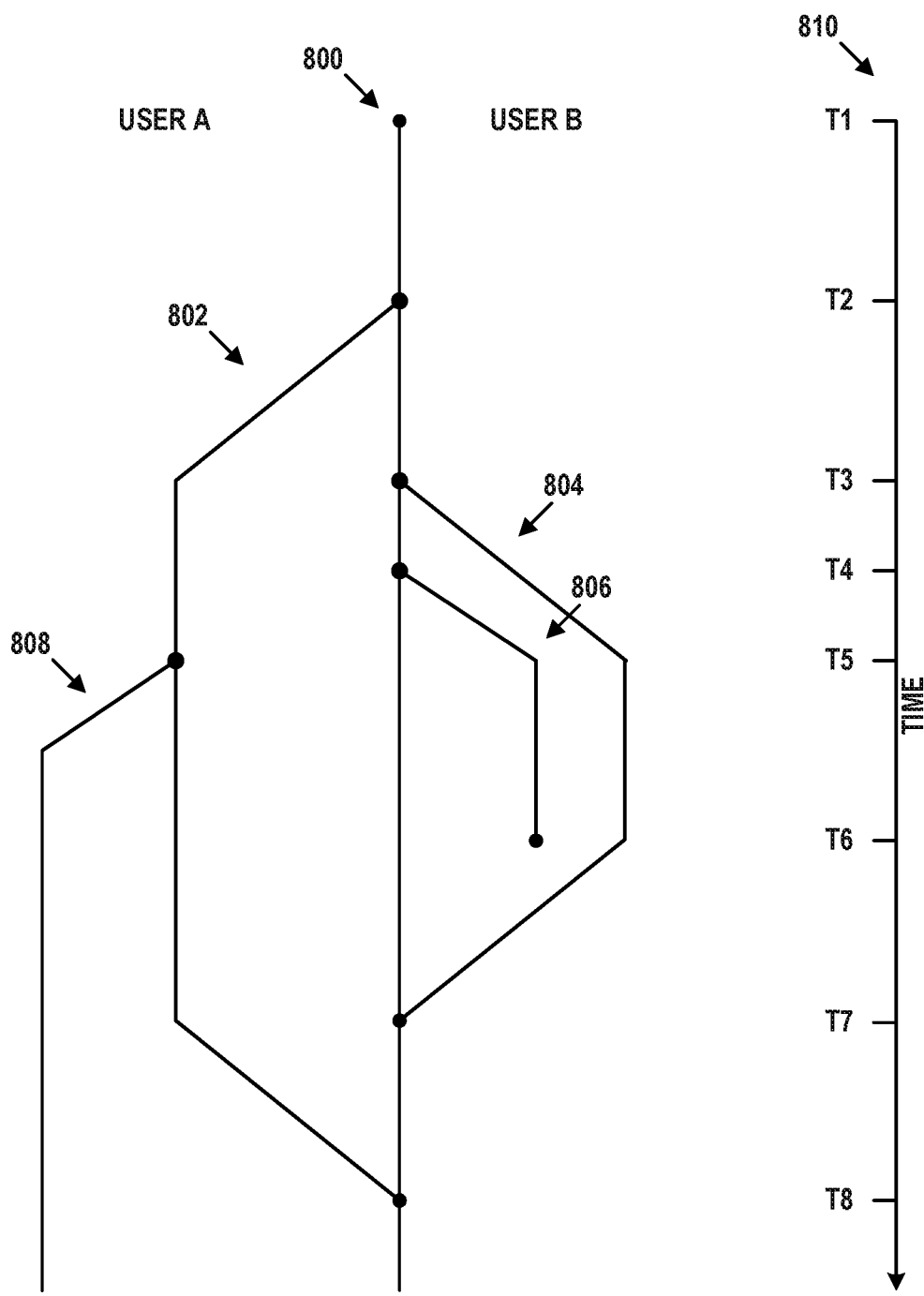
FIG. 8 depicts branching and merging of service map representations, in accordance with example embodiments.

Particularly, FIG. 8 illustrates a main line 800 and four branches 802, 804, 806, and 808. Branches 802 and 808 are editable, private copies created by user A, and branches 804 and 806 are editable, private copies created by user B. In FIG. 8, time is represented as moving from the top of the page to the bottom of the page, as depicted by timeline 810. These branches may be stored in a database of the computational instance after each change. Thus, the branches are maintained even if a user's client device disconnects in the process of editing. Each user only has access to the branches that he or she created or received, and the main line is seen by all users when in live mode.

At time T1, only main line 800 exists. In other words, the only service map is the active service map. At time T2, user A creates branch 802 off of main line 800, an editable, private copy of the active service map. User A may do this for instance, by using control 714 to toggle into draft mode, or by some other user interface control or mechanism. At time T3, user B creates branch 804 off of main line 800, another editable, private copy of the active service map. At time T3 and on into the future, branches 802 and 804 can be edited independently of one another and of main line 800.

At time T4, user B creates branch 806 off of main line 800. Branch 806 can also be edited independently of all other branches. At time T5, user A creates branch 808 off of branch 802. Thus, branch 808 is an editable, private copy of the service map of branch 802, as it stands at time T5. Branch 808 can also be edited independently of all other branches. At time T6, branch 806 ends. This may be due to user B explicitly deleting or discarding branch 806. Regardless, branch 806 does not exist past time T6.

At time T7, branch 804 is merged into main line 800. This merge may involve the most recent version of branch 804 (with any changes made since it was created). At this point, branch 804 may either cease to exist independently of main line 800 (as shown in FIG. 8), or may continue on as a separate branch that is initially identical to main line 800. Any changes made to main line 800 or branch 804 between times T3 and T7 may be combined.

Similarly, at time T8, branch 802 is merged into main line 800. Not unlike the merge of branch 804, this merge may involve the most recent version of branch 802 (with any changes made since it was created). At this point, branch 802 may either cease to exist independently of the main line (as shown in FIG. 8), or may continue on as a separate branch that is initially identical to main line 800. Any changes made to main line 800 or branch 802 between times T2 and T8 may be combined.

Beyond time T8, only two branches are shown to exist in FIG. 8—main line 800 and branch 808. The latter may continue to exist until it is deleted or merged into the main line. In some embodiments, a branch can be merged into another branch other than main line 800.

VII. EXAMPLE OPERATIONS

Figure 9:
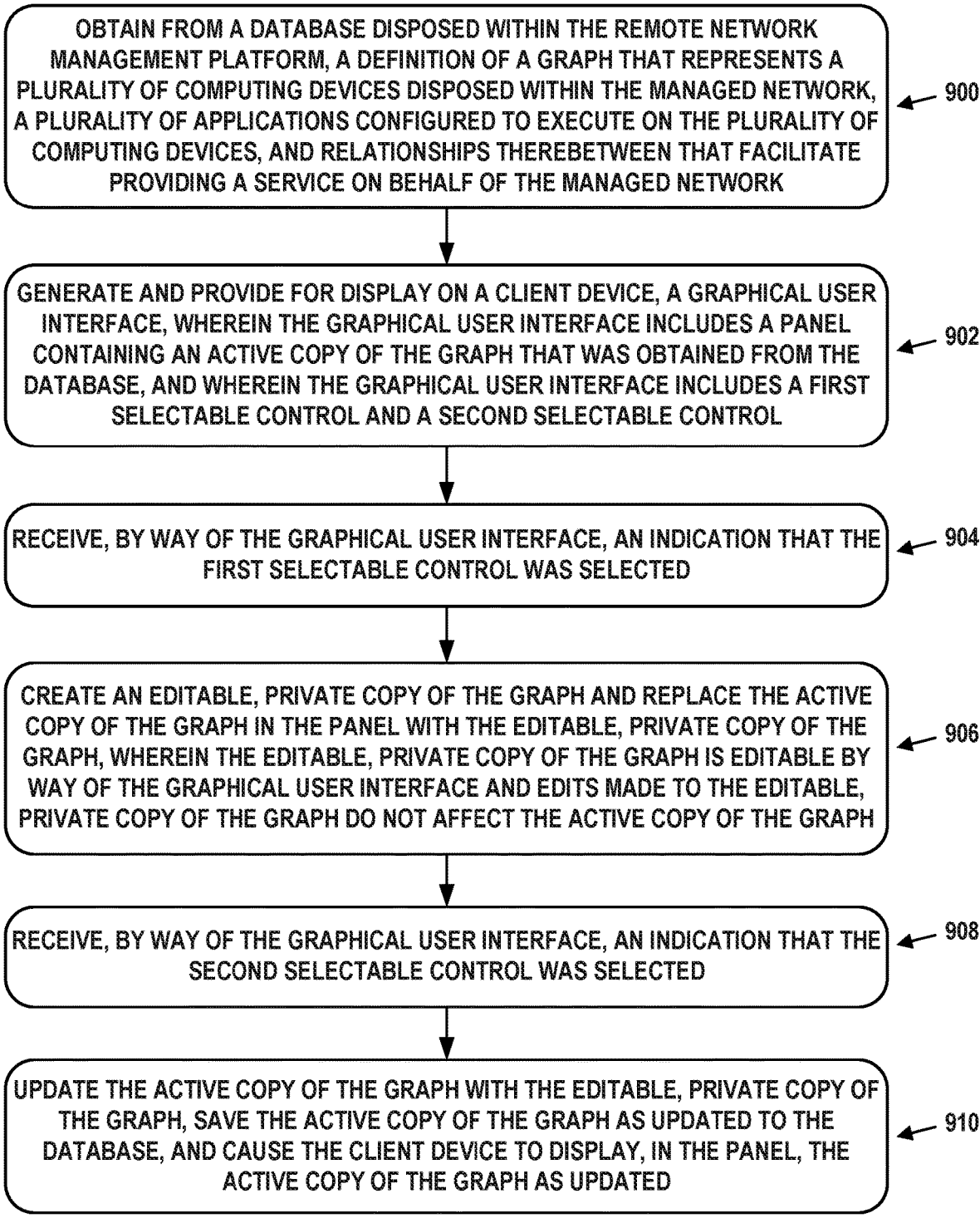
FIG. 9 is a flow chart, in accordance with example embodiments.

FIG. 9 is a flow chart illustrating an example embodiment. The process illustrated by FIG. 9 may be carried out by a computing device, such as computing device 100, and/or a cluster of computing devices, such as server cluster 200. However, the process can be carried out by other types of devices or device subsystems. For example, the process could be carried out by a portable computer, such as a laptop or a tablet device.

The embodiments of FIG. 9 may be simplified by the removal of any one or more of the features shown therein. Further, these embodiments may be combined with features, aspects, and/or implementations of any of the previous figures or otherwise described herein.

Block 900 of FIG. 9 may involve obtaining, by a computing device and from a database (both disposed within a remote network management platform that manages a managed network), a definition of a graph. The graph may represent a plurality of computing devices disposed within the managed network, a plurality of applications configured to execute on the plurality of computing devices, and relationships therebetween that facilitate providing a service on behalf of the managed network.

Block 902 may involve generating and providing for display, by the computing device and on a client device, a graphical user interface. The graphical user interface may include a panel containing an active copy of the graph that was obtained from the database. The graphical user interface may also include a first selectable control and a second selectable control.

Block 904 may involve receiving, by the computing device and by way of the graphical user interface, an indication that the first selectable control was selected.

Block 906 may involve, possibly in response to receiving the indication that the first selectable control was selected, the computing device creating an editable, private copy of the graph and replacing the active copy of the graph in the panel with the editable, private copy of the graph. The editable, private copy of the graph may be editable by way of the graphical user interface and edits made to the editable, private copy of the graph might not affect the active copy of the graph.

Block 908 may involve receiving, by the computing device and by way of the graphical user interface, an indication that the second selectable control was selected.

Block 910 may involve, possibly in response to receiving the indication that the second selectable control was selected, the computing device updating the active copy of the graph with the editable, private copy of the graph, saving the active copy of the graph as updated to the database, and causing the client device to display, in the panel, the active copy of the graph as updated. This updating procedure may involve merging changes the editable, private copy of the graph with the active copy of the graph.

In some cases, the graphical user interface includes a third selectable control, and the embodiments of FIG. 9 may further involve: receiving, by way of the graphical user interface, an indication that the third selectable control was selected, and possibly in response to receiving the indication that the third selectable control was selected, transmitting a representation of the editable, private copy of the graph to a second client device, which causes the second client device to display a prompt that allows selection of approval or rejection of the editable, private copy of the graph. These embodiments may further entail receiving the approval of the editable, private copy of the graph. Updating the active copy of the graph with the editable, private copy of the graph, saving the active copy of the graph as updated to the database, and causing the client device to display, in the panel, the active copy of the graph as updated may occur in response to receiving the approval of the editable, private copy of the graph.

In some cases, the graphical user interface includes a third selectable control, and the embodiments of FIG. 9 may further involve: receiving, by way of the graphical user interface, an indication that the third selectable control was selected, and possibly in response to receiving the indication that the third selectable control was selected, toggling the panel between displaying the editable, private copy of the graph and the active copy of the graph.

In some cases, the graphical user interface includes a third selectable control, and the embodiments of FIG. 9 may further involve: receiving, by way of the graphical user interface, an indication that the third selectable control was selected, and possibly in response to receiving the indication that the third selectable control was selected, toggling the graphical user interface between view mode and edit mode. The view mode does not permit editing of the graph displayed in the panel, and the edit mode allows editing, by way of the graphical user interface, of the graph displayed in the panel.

In some cases, historical copies of the graph are stored in the database along with respective time ranges during which each historical copy was active. The graphical user interface may include a selectable timeline with a plurality of time ranges, each associated with one of the historical copies of the graph. The embodiments of FIG. 9 may further involve: receiving, by way of the graphical user interface, selection of a point within a time range displayed on the selectable timeline, and possibly in response to receiving the selection of the point within the time range displayed on the selectable timeline, replacing the active copy of the graph in the panel with the historical copy of the graph associated with the time range.

In some embodiments, the graph displays each of the plurality of applications and the plurality of computing devices as a node, and the graph displays relationships between applications and computing devices as connections between the associated nodes. Relationships between applications and other applications, as well as between computing devices and other computing devices, may also be represented.

Other embodiments may include a proxy application disposed with the managed network. The representation of the graph may be derived, at least in part, by way of the proxy application probing the plurality of computing devices to discover the plurality of applications and the relationships. The proxy application probing the plurality of computing devices may be triggered by the computing device obtaining an address representing an entry point of the service.

VIII. CONCLUSION

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A system comprising:
  a remote network management platform that manages a managed network, wherein the managed network contains a plurality of computing devices that are capable of executing a plurality of applications, wherein the plurality of computing devices and the plurality of applications are configured to provide a service on behalf of the managed network;
  a database, disposed within the remote network management platform, containing a definition of a graph that represents the plurality of computing devices, the plurality of applications, and relationships therebetween that facilitate providing the service; and
  a computing device, disposed within the remote network management platform, wherein the computing device is configured to generate and provide for display, on a client device, a graphical user interface (GUI), wherein the GUI comprises:
    a panel region containing an active copy of the graph that was read from the database;
    a first selectable control that, when selected by way of the GUI, causes the computing device to create an editable, private copy of the graph and causes the computing device to replace the active copy of the graph in the panel region with the editable, private copy of the graph, wherein the editable, private copy of the graph is editable by way of the GUI and edits made to the editable, private copy of the graph do not affect the active copy of the graph;
    a second selectable control that, when selected by way of the GUI, causes the computing device to update the active copy of the graph with the editable, private copy of the graph, save the active copy of the graph as updated to the database, and display the active copy of the graph as updated in the panel region; and
    a linear GUI element comprising one or more selectable moments in time along the linear GUI element, wherein each of the one or more selectable moments in time corresponds to a historical copy of the graph at a respective moment in time, and wherein a particular selectable moment in time of the one or more selectable moments in time corresponds to the active copy of the graph being updated with the editable, private copy of the graph, wherein the first selectable control, the second selectable control, and the linear GUI element remain on the GUI during the active copy of the graph being replaced, updated, or both, with the editable, private copy of the graph.

2. The system of claim 1, wherein the GUI includes a third selectable control that, when selected by way of the GUI, causes the computing device to transmit a representation of the editable, private copy of the graph to a second client device, and causes the second client device to display a prompt that allows selection of approval or rejection of the editable, private copy of the graph.

3. The system of claim 2, wherein the selection of approval of the editable, private copy of the graph causes the computing device to update the active copy of the graph with the editable, private copy of the graph and save the active copy of the graph as updated to the database.

4. The system of claim 1, wherein selection of a third selectable control on the GUI causes the computing device to toggle the panel region between displaying the editable, private copy of the graph and the active copy of the graph.

5. The system of claim 1, wherein selection of a third selectable control on the GUI causes the computing device to toggle the GUI between view mode and edit mode, wherein the view mode does not permit editing of the graph displayed in the panel region, and wherein the edit mode allows editing, by way of the GUI, of the graph displayed in the panel region.

6. The system of claim 1, wherein the graph comprises each of the plurality of applications and the plurality of computing devices as a node, and wherein the graph comprises the relationships between the plurality of applications and the plurality of computing devices as connections between associated nodes.

7. The system of claim 1, wherein selection of one or more controls on the GUI cause the computing device to create two or more editable, private copies of the graph for a single user, and wherein the database stores representations of each of the editable, private copies of the graph.

8. The system of claim 1, comprising:
  a proxy application disposed with the managed network, wherein a representation of the graph is derived, at least in part, by way of the proxy application probing the plurality of computing devices to discover the plurality of applications and the relationships.

9. The system of claim 8, wherein the proxy application probing the plurality of computing devices is triggered by the computing device obtaining an address representing an entry point of the service.

10. A computer-implemented method comprising:
  obtaining, by a computing device and from a database both disposed within a remote network management platform that manages a managed network, a definition of a graph that represents a plurality of computing devices disposed within the managed network, a plurality of applications configured to execute on the plurality of computing devices, and relationships therebetween that facilitate providing a service on behalf of the managed network;
  generating and providing for display, by the computing device and on a client device, a graphical user interface (GUI), wherein the GUI comprises:
    a panel region containing an active copy of the graph that was obtained from the database;
    a first selectable control;
    a second selectable control; and
    a linear GUI element comprising one or more selectable moments in time along the linear GUI element, wherein each of the one or more selectable moments in time corresponds to a historical copy of the graph at a respective moment in time;
  receiving, by the computing device, an indication that the first selectable control was selected by way of the GUI;
  in response to receiving the indication that the first selectable control was selected, creating an editable, private copy of the graph and replacing the active copy of the graph in the panel region with the editable, private copy of the graph, wherein the editable, private copy of the graph is editable by way of the GUI and edits made to the editable, private copy of the graph do not affect the active copy of the graph;
  receiving, by the computing device, an indication that the second selectable control was selected by way of the GUI; and in response to receiving the indication that the second selectable control was selected:
  updating the active copy of the graph with the editable, private copy of the graph, saving the active copy of the graph as updated to the database;
  generating, on the linear GUI element, an additional selectable moment in time corresponding to the active copy of the graph being updated with the editable, private copy of the graph; and
  causing the client device to display, in the panel region, the active copy of the graph as updated, wherein the first selectable control, the second selectable control, and the linear GUI element remain on the GUI during the active copy of the graph being replaced, updated, or both, with the editable, private copy of the graph.

11. The computer-implemented method of claim 10, wherein the GUI includes a third selectable control, the method comprising:
  receiving, by way of the GUI, an indication that the third selectable control was selected; and
  in response to receiving the indication that the third selectable control was selected, transmitting a representation of the editable, private copy of the graph to a second client device, which causes the second client device to display a prompt that allows selection of approval or rejection of the editable, private copy of the graph.

12. The computer-implemented method of claim 11, comprising:
  receiving the selection of approval of the editable, private copy of the graph, wherein updating the active copy of the graph with the editable, private copy of the graph, saving the active copy of the graph as updated to the database, and causing the client device to display, in the panel region, the active copy of the graph as updated occurs in response to receiving the selection of approval of the editable, private copy of the graph.

13. The computer-implemented method of claim 10, wherein the GUI includes a third selectable control, the method comprising:
  receiving, by way of the GUI, an indication that the third selectable control was selected; and
  in response to receiving the indication that the third selectable control was selected, toggling the panel region between displaying the editable, private copy of the graph and the active copy of the graph.

14. The computer-implemented method of claim 10, wherein the GUI includes a third selectable control, the method comprising:
  receiving, by way of the GUI, an indication that the third selectable control was selected; and
  in response to receiving the indication that the third selectable control was selected, toggling the GUI between view mode and edit mode, wherein the view mode does not permit editing of the graph displayed in the panel region, and wherein the edit mode allows editing, by way of the GUI, of the graph displayed in the panel region.

15. The computer-implemented method of claim 10, comprising:
  receiving, by way of the GUI, selection of a particular selectable moment in time of the one or more selectable moments in time; and
  in response to receiving the particular moment in time, replacing the active copy of the graph in the panel region with the historical copy of the graph corresponding to the particular selectable moment in time.

16. The computer-implemented method of claim 10, wherein the graph comprises each of the plurality of applications and the plurality of computing devices as a node, and wherein the graph displays the relationships between the plurality of applications and the plurality of computing devices as connections between associated nodes.

17. An article of manufacture including a non-transitory computer-readable medium, having stored thereon program instructions that, upon execution by a computing device disposed within a remote network management platform that manages a managed network, cause the computing device to perform operations comprising:
  obtaining from a database disposed within the remote network management platform, a definition of a graph that represents a plurality of computing devices disposed within the managed network, a plurality of applications configured to execute on the plurality of computing devices, and relationships therebetween that facilitate providing a service on behalf of the managed network;
  generating and providing for display on a client device, a graphical user interface (GUI), wherein the GUI comprises:
    a panel region containing an active copy of the graph that was obtained from the database;
    a first selectable control;
    a second selectable control; and
    a linear GUI element comprising one or more selectable moments in time along the linear GUI element, wherein each of the one or more selectable moments in time corresponds to a historical copy of the graph at a respective moment in time;
  receiving, by way of the GUI, an indication that the first selectable control was selected;
  in response to receiving the indication that the first selectable control was selected, creating an editable, private copy of the graph and replacing the active copy of the graph in the panel region with the editable, private copy of the graph, wherein the editable, private copy of the graph is editable by way of the GUI and edits made to the editable, private copy of the graph do not affect the active copy of the graph;
  receiving, by way of the GUI, an indication that the second selectable control was selected; and
  in response to receiving the indication that the second selectable control was selected:
    updating the active copy of the graph with the editable, private copy of the graph, saving the active copy of the graph as updated to the database;
    generating, on the linear GUI element, an additional selectable moment in time corresponding to the active copy of the graph being updated with the editable, private copy of the graph; and
    causing the client device to display, in the panel region, the active copy of the graph as updated, wherein the first selectable control, the second selectable control, and the linear GUI element remain on the GUI during the active copy of the graph being replaced, updated, or both, with the editable, private copy of the graph.

18. The article of manufacture of claim 17, wherein the operations comprise:
  receiving, by way of the GUI, an indication that a third selectable control was selected; and in response to receiving the indication that the third selectable control was selected, transmitting a representation of the editable, private copy of the graph to a second client device, which causes the second client device to display a prompt that allows selection of approval or rejection of the editable, private copy of the graph.

19. The article of manufacture of claim 18, wherein the operations comprise:

receiving the selection of approval of the editable, private copy of the graph, wherein updating the active copy of the graph with the editable, private copy of the graph, saving the active copy of the graph as updated to the database, and causing the client device to display, in the panel region, the active copy of the graph as updated occurs in response to receiving the selection of approval of the editable, private copy of the graph.

20. The system of claim 1, wherein the second selectable control, when selected by way of the GUI, causes the computing device to implement the edits made via the GUI.

* * * * *